United States Patent [19]
Ching et al.

[11] Patent Number: 5,808,563
[45] Date of Patent: Sep. 15, 1998

[54] DEVICE FOR THE CONTROL OF AN AIRCRAFT SYSTEM IN MANUAL PILOT MODE USING NOTABLY A HEAD-UP DISPLAY

[75] Inventors: Ron Ching, Mukilteo, Wash.; Lawrence Webster, Miami, Fla.; François Faivre, St Medard En Jalles, France

[73] Assignee: Sextant Avionique, Meudon la Foret, France

[21] Appl. No.: 792,387

[22] Filed: Feb. 3, 1997

Related U.S. Application Data

[63] Continuation of Ser. No. 397,351, Mar. 2, 1995, abandoned.

[51] Int. Cl.⁶ .................................................... G01C 21/00
[52] U.S. Cl. .......................... 340/976; 340/971; 340/974; 340/980
[58] Field of Search ..................................... 340/990, 945, 340/963, 961, 967, 969, 971, 973, 974, 975, 977, 978, 979, 976, 980; 244/187

[56] References Cited

U.S. PATENT DOCUMENTS

| | | | |
|---|---|---|---|
| 3,594,757 | 7/1971 | Gard et al. ................................ | 340/973 |
| 3,626,163 | 12/1971 | Dommasch ............................... | 244/187 |
| 4,357,661 | 11/1982 | Lambregts et al. ....................... | 244/187 |
| 4,860,007 | 8/1989 | Konicke et al. .......................... | 340/973 |
| 4,896,154 | 1/1990 | Factor et al. .............................. | 340/995 |
| 4,914,733 | 4/1990 | Gralnick ................................... | 340/961 |
| 4,975,696 | 12/1990 | Salter, Jr. et al. ....................... | 340/990 |
| 5,043,727 | 8/1991 | Ito ............................................ | 340/984 |
| 5,111,400 | 5/1992 | Yoder .................................. | 364/424.06 |
| 5,185,606 | 2/1993 | Verbaarschot et al. .................. | 340/975 |
| 5,208,590 | 5/1993 | Pitts ......................................... | 340/990 |
| 5,248,968 | 9/1993 | Kelly et al. .............................. | 340/975 |
| 5,329,277 | 7/1994 | Dougan et al. .......................... | 340/971 |

*Primary Examiner*—Brent A. Swarthout
*Attorney, Agent, or Firm*—Oblon, Spivak, McClelland, Maier & Neustadt, P.C.

[57] ABSTRACT

A device to control an aircraft system in manual pilot mode, using notably a head-up display, is constituted by a display screen located at the position of a piece of equipment of the right-hand part of the instrument panel, the screen displaying information elements delivered by the replaced equipment and information elements to control the piloting task. Application for the controlling of a manual pilot phase by a co-pilot in an aircraft using a head-up display.

11 Claims, 4 Drawing Sheets

DEVICE FOR THE CONTROL OF AN AIRCRAFT SYSTEM IN MANUAL PILOT MODE USING NOTABLY A HEAD-UP DISPLAY

This application is a Continuation of application Ser. No. 08/397,351, filed on Mar. 02, 1995 now abandoned.

BACKGROUND OF THE INVENTION

The present invention relates to a device to control an aircraft system in manual pilot mode that notably uses a head-up display. It can be applied especially to enable the control of manual landing or take-of from the right-hand side seat, for example a co-pilot's seat, in the pilot's cabin of an aircraft.

Landing displays are being increasingly used for approaches in manual pilot mode, including in conditions of poor visibility, thus for example in poor weather corresponding to the category 3A level as defined in the aeronautical regulations.

The use of these displays and their associated systems on board aircraft requires that a certain number of control parameters should be present on the right-hand side to enable the monitoring or checking of the piloting task being performed on the left-hand side on the basis of information elements that are presented on the DISPLAY and are therefore visible only to the pilot.

These information elements are notably path-guidance commands prepared from ILS or equivalent signals.

The control parameters to be presented to the co-pilot are defined by various regulations, especially the known AC 120–28C regulations. These regulations notably require that the co-pilot should be provided with information on the vertical speed of the aircraft and on excessive deviations from the ILS beam.

Should the system be a replacement of or an addition to equipment in an already-existing aircraft whose instrument panel has therefore already been defined, the presenting of these parameters often introduces complex and costly modifications of this instrument panel, especially of the attitude display indicator (ADI), the speedometer and the indicator of information given by the radio-altimeter.

SUMMARY OF THE INVENTION

The aim of the invention is to eliminate these drawbacks by a particular presentation of the symbols at the right-hand side seat.

To this end, an object of the invention is a device to control an aircraft system in manual pilot mode, wherein said control device is formed by a display screen located at the position of a piece of equipment of the right-hand part of the instrument panel, the screen displaying information elements delivered by the replaced equipment and/or the information elements necessary to control the piloting task in the event of the use of a display unit.

The main advantages of the invention are that it improves security, simplifies the replacement or addition of systems on already existing instrument panels, simplifies the training of pilots and is simple to implement.

BRIEF DESCRIPTION OF THE DRAWINGS

Other characteristics and advantages of the invention shall appear from the following description, made with reference to the appended drawings, of which.

MORE DETAILED DESCRIPTION

Figure 1:
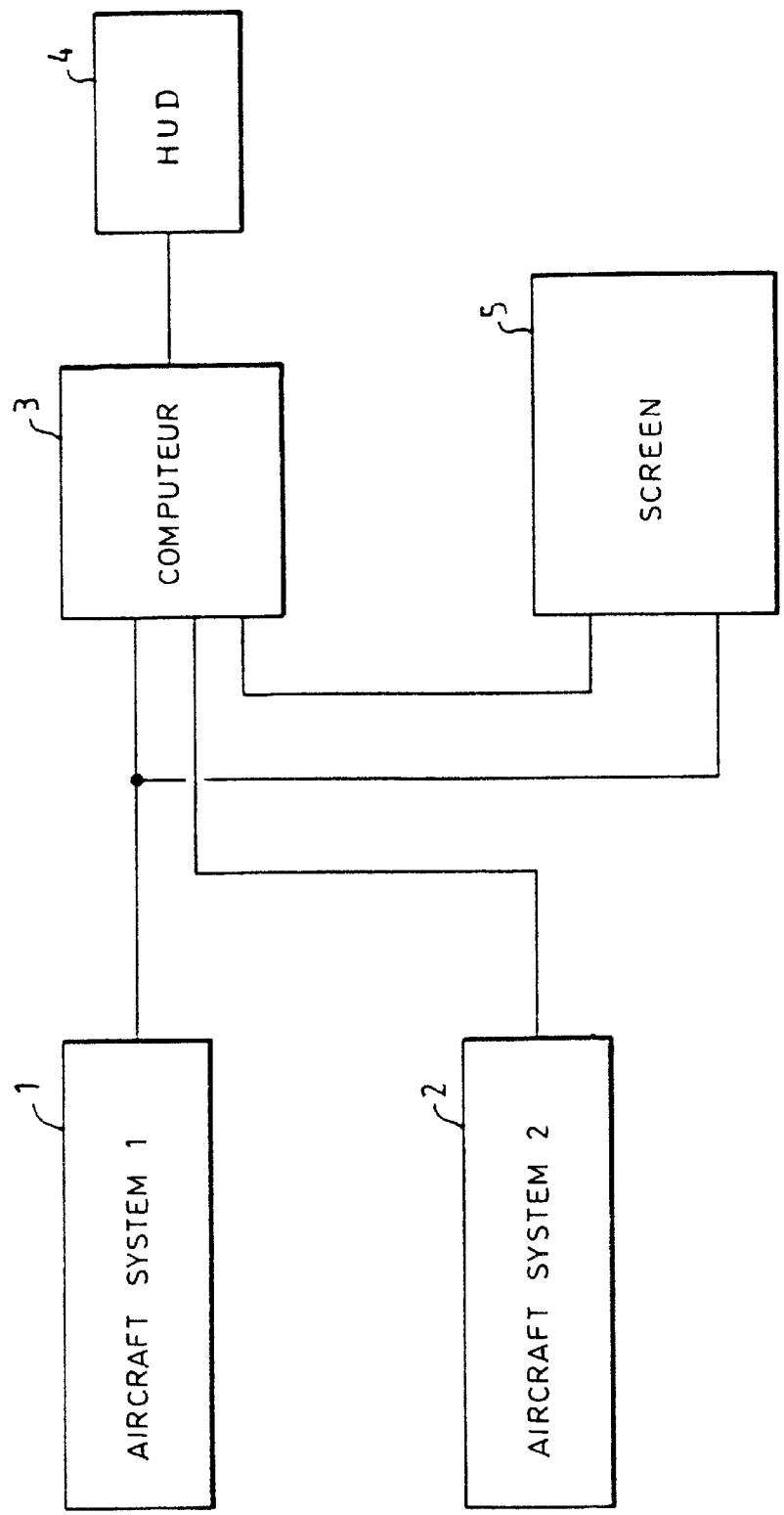
FIG. 1 exemplifies a category 3A certified system for manual landing.

FIG. 1 exemplifies a category 3A certified system for manual landing. It is formed by at least one first aircraft system 1 and a second aircraft system 2 connected to a computer 3 giving signals to a head-up display 4. The system furthermore has a screen 5 connected to the first aircraft system 1 and to the computer 3. This screen 5 acts as a control instrument for the co-pilot.

Figure 2:
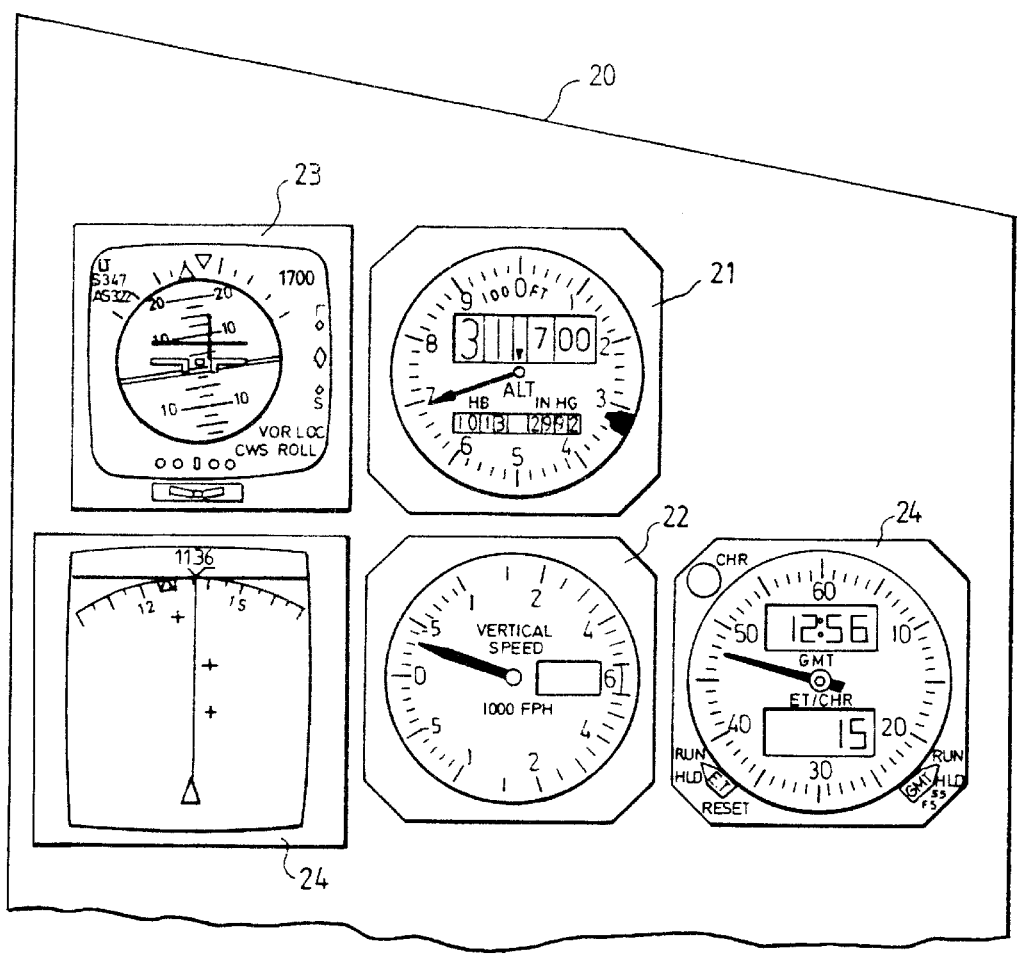
FIG. 2 shows a part of an instrument panel that is located on the right-hand side of the pilot's cabin and is provided with conventional equipment.

FIG. 2 shows a part of the instrument panel 20 that is located on the right-hand side in the pilot's cabin and is provided with conventional equipment. This part has notably a radio-altimeter 21, an air-speed indicator 22 and an ADI 23. Adding a landing control instrument to this instrument panel 20 is a complex and costly operation. For this purpose, it is necessary notably to modify the ADI, replace one of the above-mentioned items of equipment 21, 22 and other equipment 24 by a scrolling system, add an alarm and warning button. Furthermore, all the added information elements, necessary for the landing control, are dispersed, a fact that does not promote security.

The principle of the invention consists in replacing one of the above-mentioned items of equipment 21, 22 of the instrument panel by a screen having the function of the replaced equipment and of providing landing control indication information elements such as, for example, those defined in the regulation AC 120–28C.

Figure 3:
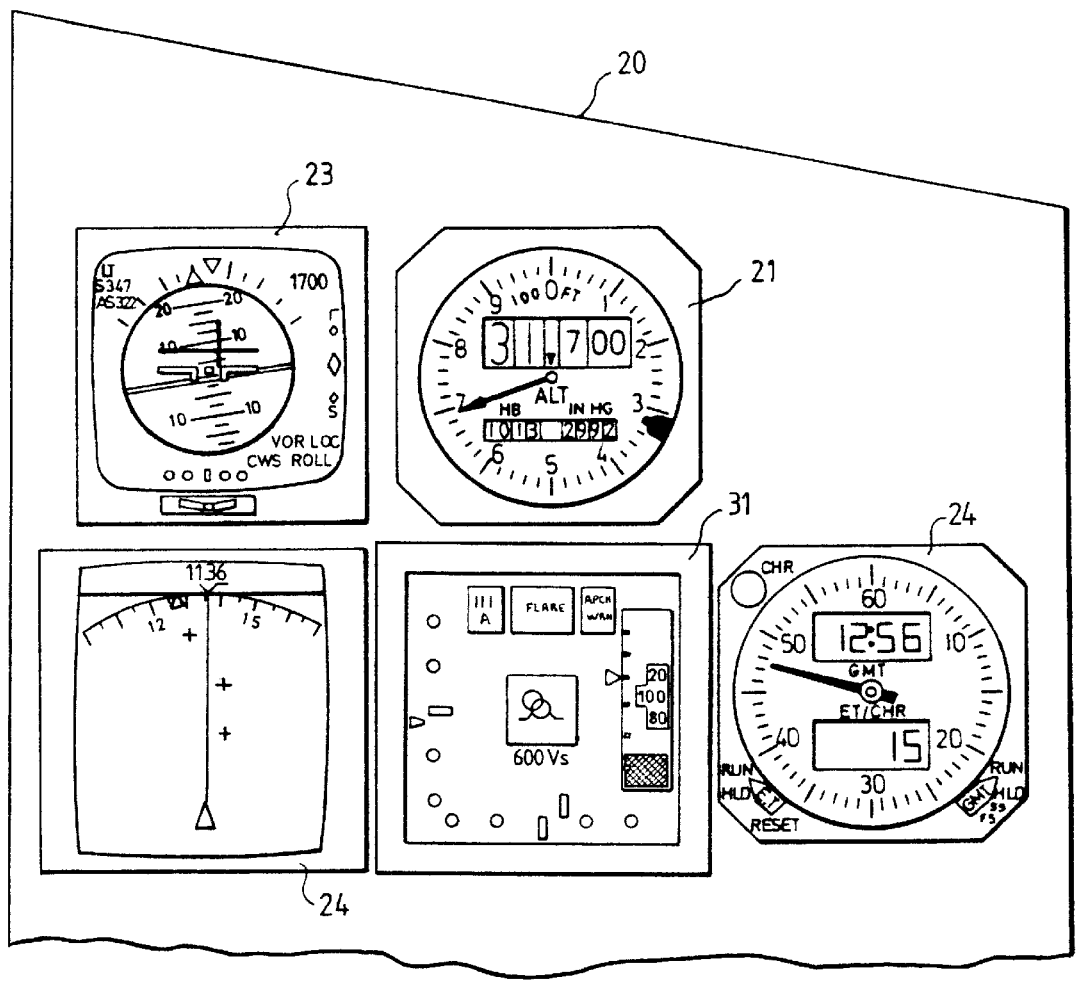
FIG. 3 shows a possible situation on the instrument panel of the device according to the invention.

In the exemplary embodiment illustrated in FIG. 3, the device according to the invention is a display screen 31 located in the position of the vertical speed indicator 22. This screen is connected for example to the first aircraft system 1 and to the computer 3 as defined with reference to FIG. 1. As a primary function, the electronic instrument reproduces the instrument that it has replaced. In this case, it shows an image of a speed indicator of the type 22 indicated here above.

The other function fulfilled by the control device is designed for landing control. For this purpose, the screen 31 displays for example a landing approach control indication. It may furthermore display information elements on take-off and taxiing. All these indications are notably specified in the regulation AC 120–28C.

The device can work, for example, as a vertical speed indicator meeting the standard FAR 135, i.e. it provides a conventional representation, with needles, of the measurement of vertical speed prepared on the basis of pressure variations, depending on whether the aircraft is rising or descending. The screen 31 displays this conventional configuration for example during operations in good visual conditions known as VMC or visual meteorological conditions. This configuration symbolizes, for example, the form of the vertical speed indicator illustrated by FIG. 2.

During so-called IMC or instrument meteorological conditions, when the mode corresponding to the above-mentioned category 3A or to take-off is selected, the screen 31 continues to display the vertical speed indication notably so that the device keeps its vertical speed indicator function. However, this information element is displayed in digital form, as illustrated for example by the value 600 displayed in the embodiment shown in FIG. 3. The measurement of this vertical speed is prepared, for example, from a baro-inertial measurement loop coupling a measurement of vertical acceleration and a measurement of atmospheric pressure. The measurement of the acceleration is, for example, acquired at the output of the inertial unit of the aircraft.

Furthermore, during IMC operations, the device according to the invention may, for example, meet the requirements of the category 3A approach certification. These requirements are notably the presenting of PNF (pilot not flying) information and alarms to the co-pilot. This information and alarms make it possible notably to ensure that the approach and the flare take place properly. In particular, the co-pilot should be capable of detecting and preventing an excessively long flare maneuver.

Figure 4:
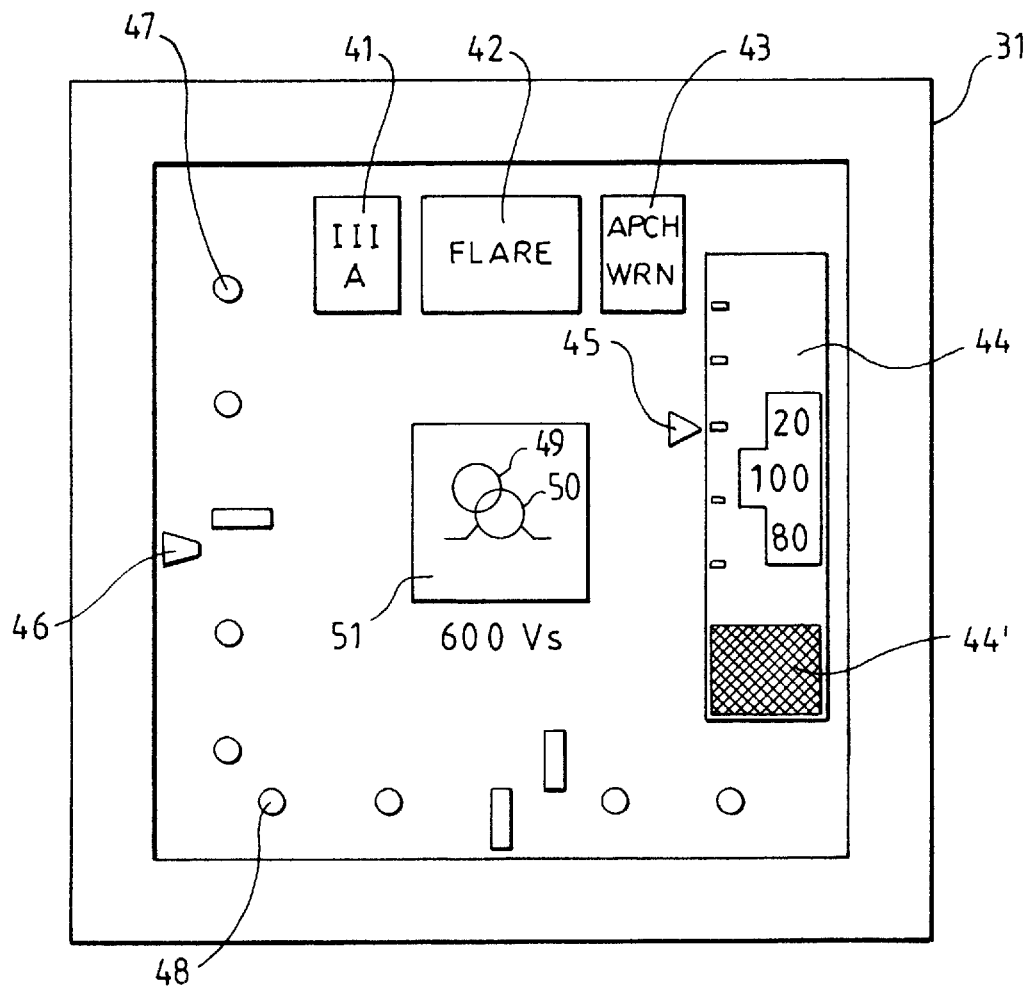
FIG. 4 shows a possible embodiment of a device according to the invention.

FIG. 4 shows an example of display on the screen 31. This display is, for example, activated by an approach in IMC mode.

Three mode and alarm indicators 41, 42, 43 appear at the top of the screen.

a mode indicator 41, here IIIA or 3A;

a FLARE indicator 42 which may, for example, flash to indicate the start of the flare maneuver;

an APCH WRN (approach warning alarm) indicator 43 which indicates, for example by turning to red, the detection of an excessive divergence, beyond tolerance values, in the approach phase.

On the right-hand side of the screen 31, there is a radio-altimeter height indicator 44 which shows the altitude, for example in the form of a strip. The darker surface at the bottom 44' rises, for example, up to the center of the strip 44 thus giving excellent information on flare speed.

In addition to altitude information, the screen presents the flare height, for example by an indicator 45.

The radio-altimeter is, for example, directly controlled to prevent common mode errors.

On its left-hand side, the screen may represent, for example, a vertical deviation indicator 46. The position of this indicator 46 on the scale 47 makes it possible notably to present the guidance deviations to the co-pilot. These deviations may either provide a direct presentation of the so-called ILS deviations, namely the deviations with respect to the vertical approach axis, or the guidance error between the speed vectors, defining the trajectory of the aircraft, and the guidance trajectory prepared by the computer.

At the bottom of the screen 31, there may be presented, for example, the localization scale 48 which, with improved resolution, prevents the rough deviations of the lateral position of the aircraft with respect to the localization signal. The scale of localization may be magnified with a variable factor to take account of the different requirements of landing and take-off. The errors in common mode are avoided by the direct use of the signals from the ILS receiver.

At the center of the screen, the guidance symbols 49, 50 may, for example, be represented. The speed vector 50 and the order of guidance 49 are entered in a square 51 which, for example, may represent the maximum permissible deviation values. When the performance limits of the system are reached, an alarm APCH WARN 43 is for example triggered. The background color of the square 51 then change to red so as to indicate a particular procedure called the "go around" procedure.

In the event of deficiency on the part of the pilot, these symbols could be used by the co-pilot to pilot the aircraft. These symbols and the screen would therefore be used to enable the co-pilot to continue the approach and flare maneuvers. This would notably provide the possibility, for example, of complementing a display system.

Finally, for example, above the square 51 that contains the guidance symbols 49, 50, the vertical speed is presented in alphanumeric form and indicates the instantaneous vertical speed at output of the inertial system.

The position of the symbols 41, 42, 43, 44, 45, 46, 47, 48, 49, 50, 51 presented here above is given by way of an example. All other positions or situations can be envisaged.

From the presentation of a possible embodiment according to the invention, as shown in FIGS. 3 and 4, the following advantages clearly emerge:

an improvement of the security of piloting operations, notably through a presentation of control information always at the same place;

a simplification of the operations for the replacement or addition of control equipment, for the device according to the invention may be designed for example to take the place of both the vertical speed indicator 22 and the approach parameters control indicator for a manual landing stage;

a simplification of the training of pilots, notably by the use of a single instrument instead of a distribution of the parameters to be checked between at least two instruments;

lower cost of equipment for airlines, notably by a simpler modification of the instrument panel.

What is claimed is:

1. A device formed as a replacement for a previously existing portion of a right-hand part of an aircraft instrument panel wherein said device functions to provide control indicators allowing control of an aircraft system in manual pilot mode, said device including a display screen for displaying first information elements normally displayed by said previously existing portion and second information elements for allowing control of approach parameters and providing indications of deviations of said aircraft from a predetermined landing path including providing guidance symbols representing maximum permissible deviation values of said aircraft from said predetermined landing path and wherein said second information elements further include an alarm indicator when said maximum permissable deviation values are exceeded, said alarm indicator including a visual display including providing a visible indication resulting from a change in the background color of the predetermined bounded area where said guidance symbols are located.

2. A device according to claim 1, wherein the screen displays a symbol representing the first information elements when the second information elements are not used.

3. A device according to claim 2, wherein the first information elements include a vertical speed indicator.

4. A device according to claim 1, wherein the screen displays mode and alarm indicators.

5. A device according to claim 1, wherein the screen displays a flare indicator.

6. A device according to claim 1, wherein the screen displays a path deviation indicator.

7. A device according to claim 1, wherein the screen gives an indication of the flare height.

8. A device according to claim 1, wherein the screen gives an indication of vertical deviation from an approach axis.

9. A device according to claim 1, wherein the screen shows a localization scale which indicates substantial deviations of a lateral position of the aircraft with respect to a localization signal.

10. A device according to claim 1, wherein vertical speed is shown in alphanumeric digital form.

11. A device according to claim 10 wherein, when landing approach control information is not used, the screen displays a standard vertical speed indicator.

* * * * *